(12) United States Patent
Liu et al.

(10) Patent No.: US 6,319,487 B1
(45) Date of Patent: Nov. 20, 2001

(54) SYNTHESIS OF SAPO-44

(75) Inventors: Zhongmin Liu, Dalian; Xiexian Guo, deceased, late of Dalian, Juan Lianf, legal representative; Guangyu Cai, Dalian, all of (CN)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/414,700

(22) Filed: Oct. 8, 1999

Related U.S. Application Data

(62) Division of application No. 08/949,802, filed on Oct. 14, 1997, now Pat. No. 6,162,415.

(51) Int. Cl.⁷ ..................................................... C01B 37/08
(52) U.S. Cl. .................. 423/706; 423/306; 423/DIG. 30; 502/214
(58) Field of Search ..................................... 423/706, 306, 423/DIG. 30; 502/214

(56) References Cited

U.S. PATENT DOCUMENTS

| | | | |
|---|---|---|---|
| 4,440,871 | * | 4/1984 | Lok et al. . |
| 4,499,327 | * | 2/1985 | Kaiser . |
| 4,793,984 | * | 12/1988 | Lok et al. . |
| 4,861,743 | * | 8/1989 | Flank et al. . |
| 4,861,938 | * | 8/1989 | Lewis et al. . |
| 5,095,163 | * | 3/1992 | Barger . |
| 5,185,310 | * | 2/1993 | Degnan et al. . |
| 5,191,414 | * | 3/1993 | Barger et al. . |
| 5,230,881 | * | 7/1993 | Miller . |
| 5,609,843 | * | 3/1997 | Wendelbo . |
| 5,663,471 | * | 9/1997 | Kvisle et al. . |
| 5,714,662 | * | 2/1998 | Vora et al. . |
| 5,744,680 | * | 4/1998 | Mulvaney, III et al. . |
| 5,879,655 | * | 3/1999 | Miller et al. . |
| 6,001,328 | * | 12/1999 | Lillerud et al. . |
| 6,162,415 | * | 12/2000 | Liu et al. . |
| 6,238,550 | * | 5/2001 | Strohmaier et al. . |

* cited by examiner

*Primary Examiner*—David R. Sample

(57) ABSTRACT

A method for making molecular sieves comprising silicoaluminophosphate 44 (SAPO-44) or substantially pure SAPO-44 and a method for using the molecular sieves so prepared for oxygenate conversion to olefins.

10 Claims, No Drawings

SYNTHESIS OF SAPO-44

This is a divisional of U.S. application Ser. No. 08/949,802, filed Oct. 14, 1997, now U.S. Pat. No. 6,162,415.

FIELD OF THE INVENTION

The present invention relates to a method of synthesizing a molecular sieve comprising silicoaluminophosphate 44 (SAPO-44).

BACKGROUND OF THE INVENTION

Light olefins (defined herein as ethylene, propylene, butenes and mixtures thereof) serve as feeds for the production of numerous chemicals and polymers. Light olefins traditionally are produced by petroleum cracking. Due to the escalating cost of crude petroleum, there are increasing efforts to develop light olefin production technologies based on alternative feedstocks. An important type of alternative feedstocks are oxygenates, such as alcohols, particularly methanol, dimethyl ether, dimethyl carbonate and ethanol. Alcohols may be produced by fermentation, or from synthesis gas derived from natural gas, petroleum liquids, carbonaceous materials, including coal, recycled plastics, municipal wastes, or any organic material. Because of the wide variety of sources, alcohols, alcohol derivatives, and other oxygenate have promise as an economical, non-petroleum source for olefin production.

Because light olefins are the most sought after products from the catalytic petroleum cracking and oxygenate conversion processes, a continuing need exists for new catalysts and/or new ways of making known catalysts to increase the yield of light olefin products and/or reduce the yield of unwanted products such as heavy hydrocarbons having molecular weights heavier than butane or low-valued by-products like methane.

Most catalysts that are used in the petroleum cracking and oxygenate conversion processes are molecular-sieve containing catalysts. A molecular sieve can be zeolitic—zeolites—or non-zeolitic. Typical examples of zeolitic molecular sieves are zeolite A, zeolite X zeolite Y, ZSM-5. ZSM-34, erionite, chabazite, and others. A number of non-zeolitic molecular sieves, particularly silicoaluminophosphates (SAPO's) have been synthesized and investigated as catalysts for converting oxygenates or cracking heavy hydrocarbons to light olefins.

SAPO's have a three-dimensional microporous crystalline framework of $PO_2^+$, $AlO_2^-$, and $SiO_2$ tetrahedral units. Because an aluminophosphate ($AlPO_4$) framework is inherently neutral, the incorporation of silicon into the $AlPO_4$ framework by substitution generates add sites and acidity. Controlling the quanity and location of silicon atoms incorporated into an $AlPO_4$ framework is important in determining the catalytic properties of a particular SAPO molecular sieve. Properly adjusted acid strength and acid site density are the keys to a good petroleum cracking or oxygenate conversion catalyst.

The catalytic properties of a SAPO catalyst also can be modified after the SAPO molecular sieve has been synthesized. This type of "post-synthesis" modification is accomplished by treating the molecular sieve with metallic, semi-metallic or non-metallic materials comprising nickel, cobalt, manganese, magnesium, barium, strontium, lanthanides, actinides, fluorine, chlorine, chelating agents, and others. The modifiers may or may not become part of the final composition of the modified catalyst.

SAPO's suitable for converting tho oxygenates to light olefins include SAPO-17, SAPO-18, SAPO-34 and SAPO-44. These are small-pore molecular sieves with pore diameter smaller than about 5 Angtroms. Small pores are believed to favor light olefins production as a result of sieving effects. For the chabazite-like SAPO-34 and SAPO-44 molecular sieves, it may be possible to incorporate more silicon atoms into the tetrahedral positions of the framework to afford greater flexibility in adjusting their acidic properties.

A hydrothermal synthesis method for making SAPO-44 was described in USA 4,440,871. The materials were aqueous silica sol, aluminum isopropoxide, orthophosphoric acid, and an organic template, cyclohexylamine. The synthesis was performed at 200° C. for 52 hours. The SAPO-44 was obtained as the "major phase" in the product, but the product was impure. It contained unidentified materials. A similar method based on the same starting materials and added hydrofluoric acid (HF) was reported by U. Lohse et al, in *J. Chem. Soc. Faraday Trans.* 91, 1155 (1995). In the presence of HF, the reaction time was shortened to five hours at 200° C. It is not clear how pure the SAPO-44 products were. Among the five products reported in the paper, at least one of them contained SAPO-35 impurity.

Because SAPO-44 can be used as a catalyst for the hydrocarbon cracking and oxygenate conversion processes, it is desirble to produce molecluar sieve catalysts comprising SAP44 from cheaper starting materials and/or under less demanding reaction conditions. It is preferable to produce a molecular sieve product consisting essentially of SAPO-44. It is also preferable to avoid using highly corrosive reactants such as hydrofluoric acid (HF) in the molecular sieve synthesis reaction mixture.

SUMMARY OF THE INVENTION

The present invention provides a method which comprises forming a mixture comprising a silicon component; an organic template at a first molar ratio of greater than about 1 to an aluminum component; and a phosphorus component at a second molar ratio of less than about 1 to aid aluminum component, and subjecting said mixture to conditions effectove to produce molecular sieves comprising siliconaluminophosphate 44.

DETAILED DESCRIPTION OF THE INVENTION

The present invention provides a method of making a molecular sieve catalyst comprising silicoaluminophosphate 44 (SAPO-44). preferably in substantially pure form.

The method generally comprises forming a mixture comprising a silicon component, an aluminum component, a phosphorus component, and a template. This mixture then is allowed to go through an optional aging period before being subjected to a hydrothermal treatment at an elevated temperature. The product formed from the hydrothermal treatment may be calcined further at an elevated temperature. Either before or following the optional calcination, the molecular sieve product may be modified further using an ion-exchange method or other types of modifications such as steaming, to produce a molecular sieve comprising SAPO-44, preferably a molecular sieve consisting essentially of pure SAPO-44.

A number of silicon compounds and their mixtures may be used as the silicon component for the method of the present invention. The silicon compounds include, but are not limited to silica sol silica gel, colloidal silica, filmed silica, silicic acid, sodium silicate, tetraethyl silicate, tetramethyl silicate, and mixtures thereof. A preferred silicon component comprises a material selected from the group consisting of silica sol, silica gel, colloidal silica, filmed silica, silicic acid, and mixturs thereof The silicon compounds can be purchased from many commercial sources such as Aldrich Chemical Company, du Pont Company, Johnson Matthey Catalog Company, Merck Company and others.

Many aluminum compounds and their mixtures are suitable for use as the aluminum component in the present invention. The aluminum compounds include, but are not necessarily limited to aluminum oxide, boehmite, pseudo boehmite, aluminum hydroxy chloride, aluminum alkoxides such as aluminum tri-isopropoxide, aluminum tri-ethoxide, aluminum tri-n-butoxide and aluminum tri-isobutoxide, and mixtures thereof. A preferred aluminum component comprises a material selected from the group consisting of boehmite and pseudo boehmite. These compounds can be purchased from many companies such as Aldrich Chemical Company, Reheis Company, Aluminum Company of America, Vista Company, and others.

The phosphorus compounds suitable for use as the phosphorus component include but are not necessarily limited to orthophosphoric acid, phosphoric acid, trimethyl phosphate, triethyl phosphate, and mixtures thereof. A preferred phosphorus component comprises orthophosphoric acid ($H_3PO_4$). Another preferred phosphorus component comprises the commercially available 85 wt % phosphoric acid (in water). Alternately, phosphorus oxides ($P_2O_3$, $P_2O_4$, $P_2O_5$, and $POCl_3$) may be used, preferably after they are dissolved in a suitable solvent such as water. These phosphorus compounds can be purchased from companies such as Aldrich Chemical Company, Merck Company, MTM Research Chemicals, Fluka Cheamie AG, and others.

A suitable organic template comprises a material selected from the group consisting of organic amines, organic ammonium salts, and mixtures thereof. A preferred organic template comprises cyclohexylamine (CHA). Another preferred template comprises a material selected from the group consisting of cyclohexylammonium chloride, cyclohexylammonium bromide, other cyclohexylammonium salts, and mixtures thereof. The organic templates can be purchased from commercial sources like Aldlich Chemical Company, MTM Research Chemicals, and others.

A solvent can be mixed with the organic template before the template is added to the reaction mixture. Preferably, the organic template is completely mixable with, or soluble in, the solvent. Suitable solvents include but are not necessarily limited to water, methanol, ethanol, n-propanol, isopropanol, $C_4$ alcohols, ethylene glycol, 1,2-propylene glycol, 1,3-propylene glycol and mixtures thereof. A preferred solvent comprises water.

The aluminum component and the phosphorus are mixed in a suitable solvent to form a first mixture of uniform composition and texture. Adequate mixing, stirring, or agitation usually is used. To this mixture is added the silcon component, followed by the organic template. Alternately, the silicon component and the organic template may be combined to form a second mixture of uniform composition and texture. This second mixture is mixed with the first mixture. Other permutations of how the indivdual components are mixed may be possible so long as final mixture with uniform composition and texture is formed.

In order to make a molecular sieve comprising SAPO-44, the molar ratios of the components in the mixture must be controlled and maintained. Before being subjected to conditions effective to produce the molecular sieve product, the final reaction mixture, excluding any other organic or inorganic moieties or species which may be present is characterized by a general formula as follows:

$$T_a Si_w Al_x P_y O_z \cdot b H_2 O$$

wherein T represents the organic template.

The molar ratio of the organic template to aluminum, a/x, is in the range of from about 1 to about 5, preferably from about 1.2 to about 4. The molar ratio of the template to phosphorus, a/y, is in the range of from about 1 to about 5. Preferably from about 1.2 to about 4. The molar ratio of the template to silicon, a/w, is in the range of from about 2 to about 8, preferably from about 2.5 to about 6. The molar ratio of phosphorus to aluminum, y/x, is in the range from about 1 to about 0.2. The molar ratio of the template to water, a/b is in the range from about 0.02 to about 0.2, preferably in the range from about 0.04 to about 0.1. z is the oxygen needed to balance the ionic charges of Si, Al, and P present as expressed in the formula. As long as the molar ratio requirements of the mixture are satisfied according to the formula shown above, many different procedures may be used to synthesize a desired product.

It is preferable to maintain the pH value of the final reaction mixture in the range from about 5.5 to about 8.5, preferably from about 6 to about 7.5. The pH value of a mixture may be adjusted, if desired, by adding an appropriate amount of a base such as ammonia/ammonium hydroxide to increase the ph, or an appropriate amount of a suitable inorganic or organic acid such as phosphoric acid, HCl, acetic acid, formic acid, $CO_2$ and others to decrease the pH.

It is preferable to use adequate mixing, blending, stirring, or agitation to provide a uniform composition throughout the mixture. A concentration or composition gradient should be minimized because such a gradient could result in the formation of different molecular sieve products.

Preferably, a constant temperature is maintained during the preparation of the mixture. Mixing of some of the components is not thermodynamically neutral. Cooling or heating may be required to provide a constant temperature environment. A suitable temperature for preparation of a mixture is in the range of from about 10° C. to about 90° C., preferably from about 20° C. to about 65° C. Pressure is usually not critical for preparing a mixture unless one or more gases are used to control other reaction parameters, such as pH, temperature, or concentration.

Once a mixture is prepared, the mixture optionally may be aged for a certain period of time in the range of from about 0 hours to about 200 hours before the mixture is subjected to conditions effective to produce a desired product comprising SAPO-44. Aging can be accomplished at a temperature in the range of from about 0° C. to about 95° C., preferably in the range of from about 20° C. to about 65° C., with or without agitation/stirring.

After aging, if any, the final reaction mixture is treated under conditions effective to produce a molecular sieve product comprising SAPO-44, preferably in substantially pure form. The mixture usually is placed in a metallic autoclave which may be lined with an inert liner to prevent the metal surface of the autoclave from reacting with the reaction mixture. Other pressure vessels made of heavy glass or plastic walls also may be used as long as the wall material does not react with the reaction mixture. With or without agitation/stirring, the mixture is heated to a temperature in the range of from about 100° C. to about 270° C., preferably from about 150° C. to about 230° C., for a period of time in the range from about 30 minutes to about 800 hours, preferably in the range from about 5 hours to about 200 hours. The required time period depends on the temperature and composition of the mixture.

An autogenic pressure usually is maintained. If preferred, a non-reactive gas such as nitrogen, argon, helium, and mixtures thereof may be used to provide additional pressure. Other gases also may be used, if desirable. One such gas which may be used to provide pressure and to change the pH value of the mixture is $CO_2$. CO is another gas that may be used unless CO undesirably reacts with the mixture or certain components of the mixture.

After the formation of a SAPO-44 containing product, the product is separated and recovered by many known techniques, such as filtration, centrifugation, sedimentation, or a combination thereof. The recovered product preferably is dried at a reduced pressure, an elevated temperature, or both. A suitable pressure is in the range of from about 0.01 kPa to about 150 kPa.

With or without being dried, the recovered product preferably is calcined to remove the organic templates. The calcination is carried out at a temperature in the range of from about 250° C. to about 800° C., preferably from about 350° C. to about 650° C. in an oxidizing atmosphere in order to burn off the organic template, preferably in air or an oxygen containing gas. Non-oxidizing atmospheres also may be used, including but not necessarily limited to nitrogen, hydrogen, water (steam) and mixture thereof. Steam also may be used with an oxidizing atmosphere for the calcination. The time period for the calcination is in the range of from about 30 minutes to about 72 hours, preferably from about 2 hours to about 48 hours.

Using the methods known in the art, the SAPO-44 molecular sieve products can be further ion-exchanged into an essentially complete hydrogen form with very low level of residual metal ions. Controlled ion-exchange also can be carried out to make a partial hydrogen form, or a fully ion-exchanged form of a SAPO-44 molecular sieve.

Catalysts made according to the present invention can be used to convert oxygenates to olefins, or to convert hydrocarbons to lower molecular weight products, particularly to light olefins (ethylene, propylene, butenes and mixtures thereof).

Oxygenates can be converted to olefins by contacting an oxygenate feed with a catalyst comprising SAPO-44 under conditions effective to produce olefins, preferably light olefins such as ethylene, propylene, butenes, and mixtures thereof.

Oxygenates suitable for use in the feed include, but are not necessarily limited to aliphatic alcohols, ethers, carbonyl compounds (aldehydes, ketones, carboxylic acids, esters, carbonates and the like), alkyl halides, alkyl amines, and mixtures thereof. Preferred oxygenates are methanol, ethanol, n-propanol, isopropanol, n-butanol, sec-butanol, dimethyl ether, methylethyl ether, diethyl ether, dimethyl carbonate, and mixtures thereof.

Effective conditions for oxygenate conversions are known in the art, and include, but are not necessarily limited to: a temperature in the range from about 200° C. to about 800° C.; a pressure in the range of from about 1 kPa to about 2 Mpa; a Weight Hourly Space Velocity (WHSV) in the range of from about 0.01 to about 10,000 $h^{-1}$. Because the feed may contain diluents and the catalyst may contain filler and/or binder materials, WHSV is calculated on the weight of the oxygenate feed itself and the weight of the molecular sieve component in the catalyst. Diluents can be mixed with the oxygenates as feed. The amounts of diluent used are in the range of from about 0 wt % to about 95 wt % of the total feed. Suitable diluents include but are not necessarily limited to water (steam), $CO_2$, hydrogen, nitrogen, argon, and mixtures thereof.

The oxygenate feed is contacted with the catalyst in a conversion reactor under effective conditions for conversion. A suitable conversion reactor is a fixed bed reactor, a moving bed reactor, a fluidized bed reactor, or another similar type of reactor. The products and any unreacted feedback then are separated from the catalyst, and the products are purified. Unreacted feedstock may be recycled back to the conversion reactor or otherwise disposed. If the catalyst is deactivated, it is regenerated. Regeneration can be carried out in the conversion reactor itself or in a separate regeneration reactor. Regeneration usually is carried out at an elevated temperature, in the range of from about 350° C. to about 95° C., and in the presence of an oxygen containing atmosphere. Sometimes treating a deactivated catalyst with hydrogen at elevated temperatures also is effective to regenerate the catalytic performance of the oxygenate conversion catalyst.

Catalysts of the present invention also can be used for conversion of relatively high molecular weight hydrocarbons to hydrocarbons having lower molecular weight Suitable hydrocarbon feedstocks include, but are not necessarily limited to naphtha and similar hydrocarbons. The feedstocks preferably comprise mostly non-aromatic compounds with at least five carbon atoms. Preferred products comprise light olefins (ethylene, propylene, butenes, and mixtures thereof.

Typical reaction conditions for the hydrocarbon conversions are known in the art, and include, but are not necessarily limited to: a temperature in the range of from about 250 to about 900° C., a pressure in the range of from bout 1 kPa to about 2 Mpa; a weight hourly space velocity (WHSV) in the range of from about 0.01 to about 10,000 $h^{-1}$. Because the feed may contain diluents and the catalyst may contain filler and/or binder materials, WHSV is calculated on the weight of the hydrocarbon feed itself and the weight of the molecular sieve component in the catalyst. Diluents such as water (steam), $CO_2$, hydrogen, nitrogen, and others can be mixed with the feedstocks, The amounts of diluents used are in the range of from about 0 wet to about 95 wt % of the total feed.

The hydrocarbon feed is contacted with the catalyst in a conversion reactor under effective conditions for conversion. A suitable conversion reactor is a fixed bed reactor, a moving bed reactor, a fidized bed reactor, or other similar types of reactor. The products and any unreacted feedstock then are separated from the catalyst, and the products are purified. Unreacted feedstock may be recycled back to the conversion reactor or otherwise disposed. If the catalyst is deactivated, it is regenerated. Regeneration can be carried out in the conversion reactor or in a separate regeneration reactor. Regeneration usually is carried out at an elevated temperature in the range of from about 350° C. to about 950° C., and in the presence of oxygen. Sometimes treating a deactivated catalyst with hydrogen at elevated temperatures also is effective to regenerate the catalytic performance of the hydrocarbon conversion catalyst.

The invention will be better understood with reference to the following examples, which illustrate, but do not limit the invention, which is solely defined by the claims.

EXAMPLE I

A reaction mixture was prepared by mixing 11.53 g of 85 wt % orthophosphoric acid and 15.5 g of water. To this mixture was added 6.87 g of boehmite (74.2 wt % alumina and 25.8 wt % water) with adequate stirring to make the mixture uniform. 6.9 grams of silica gel (26 wt % $SiO_2$, 74wt % $H_2O$) were added and the mixture was stirred to become homogeneous. Finally, 17.1 grams of cyclohaxylamine (CHA) (100%) and 11.9 grams of water were added to this mixture with stirring to form a homogeneous mixture. The composition of the final reaction mixture in molar oxide ratios was 3 CHA:$Al_2O_3$: $P_2O_5$: 0.6 $SiO_2$:40 $H_2O$. This reaction mixture was sealed in a 100 ml stainless steel vessel and heated in an oven at 200° C. at autogeic pressure for 72 hours. The reaction mixture was then filtered, washed with distilled water, and dried at 110° C. to recover a solid product, "as-sythesized" SAPO-44. This "as-synthesized" SAPO-44 was calcined by heating to 550° C. over two hours in air and then maintained at 500° C. for another three hours. The $Al_2O_3$: $P_2$: $O_5$: $SiO_2$ molar ratio in the product was about: 1:0.74:0.92. X-ray diffraction (XRD) showed that the product was substantially pure SAPO-44. No by-products were identified by XRD. Nuclear magnetic reaonance (NMR) of sliicon-29 showed that silicon distribution for Si(4Al):Si(3Al):Si(2Al):Si(1Al):Si(0Al) in the product was (in atomic %) 61.0:23.7:5.5:4.2:5.6. Si(4Al) means that the silicon atom is surround by four Al—O— groups; Si(3Al), three; Si(2Al), two; Si(1Al), one; and Si(0Al), zero such Al—O— groups.

EXAMPLE II

Procedures similar to EXAMPLE I were repeated except that the compositon of the final reaction mixture in molar oxide ratios was 3 CHA:$Al_2O_3$: $P_2O_5$: $SiO_2$: 40 $H_2O$. The $Al_2O_3$:$P_2O_5$: $SiO_2$ molar ratio in the SAPO-44 molecular sieve product was about: 1: 0.77: 0.85. X-ray diffraction QXRD) showed that the product was substantially pure SAP-044. No by-products were identified by XRD. Silicon-29 NMR showed that silicon distribution for Si(4Al):Si(3Al):Si(2Al):Si(1Al):Si(0Al) in the product was (in atomic %) 45.3:23.9:11.5:9.9:9.8.

EXAMPLE III

Procedures similar to EXAMPLE I were repeated except that the composition of the final reaction mixture in molar oxide ratios was 2 CHA : $Al_2O_3$:$P_2O_5$: $SiO_2$: 0.6 $SiO_2$: 80 $H_2O$. The $Al_2O_3$:$P_2O_5$: $SiO_2$ molar ratio in the SAPO-44 molecular sieve product was about: 1: 0.68: 1.41. X-ray diffraction (XRD) showed that the product was substantially pure SAPO-44. No by-products were identified by XRD. Silicon NMR showed that silicon distribution for Si(4Al):Si(3Al):Si(2Al):Si(1Al):Si(0Al) in the product was (in atomic %): 30.9:23.5:15.9:15.6:13.7.

EXAMPLE IV

The catalysts prepared in EXAMPLES, I, II, and III were tested for their ability to convert methanol to olefins. The catalysts were pelletized and crushed to 20–40 mesh in size. 1.28 grams of each catalyst were tested separately in a tubular reactor. Prior to use, the catalysts were treated at 500° C. in a flowing nitrogen stream, 60 ml/min, for one hour. The methanol conversion reactions were carried out at a 2 $h^{-1}$ weight hourly space velocity (WHSV) of methanol feed in a nitrogen carrier gas at 60 ml/min. The WHSV was measured for methanol only, excluding nitrogen. The data reported below were obtained after the reaction was on-stream for two minutes. The products were analyzed by a standard gas chromatographic methods. The results are shown below:

| Catalyst | EXAMPLE I | EXAMPLE II | EXAMPLE III |
|---|---|---|---|
| Methanol Conversion (wt %) | 100 | 100 | 100 |
| Selectivity (wt %) | | | |
| $CH_4$ | 1.2 | 1.1 | 1.7 |
| $C_2H_4$ | 39.6 | 31.4 | 26.0 |
| $C_2H_6$ | 0.5 | 1.0 | 3.1 |
| $C_3H_6$ | 39.2 | 34.9 | 32.7 |
| $C_3H_8$ | 5.4 | 12.2 | 21.3 |
| $C_4H_8$ | 11.9 | 12.9 | 12.9 |
| $C_4H_{10}$ | 2.2 | 2.4 | 2.4 |
| $C_5^-$ | 0 | 4.1 | 0 |
| $C_5^+$ | 0 | 0.1 | 0 |

These results indicate that molecular sieves comprising substantially pure SAPO-44 could be prepared according to the method of the present invention. The molecular sieves are capable of converting methanol to light olefins in high selectivities.

Persons of ordinary skill in the art will recognize that many modifications may be made to the present invention without departing from the spirit and scope of the present invention. The embodiments described herein are meant to be illustrative only and should not be taken as limiting the invention, which is defined in the following claims.

We claim:

1. A SAPO-44 molecular sieve, wherein said SAPO-44 comprises 30.9 to 61.0 percent Si(4Al) species.

2. A SAPO-44 molecular sieve as claimed in claim 1, wherein said SAPO-44 contains 45.3 to 61.0 percent Si(4Al) species.

3. A SAPO-44 molecular sieve which is made by a method comprising:
   forming a mixture comprising, a silicon component, an aluminum component, an organic template at a ratio of organic template to aluminum of at least 1, and a phosphorus component; and
   subjecting said mixture to conditions effective to produce said SAPO-44 , wherein the SAPO-44 contains 30.9 to 61.0 percent Si(4Al) species.

4. A SAPO-44 molecular sieve according to claim 3, wherein said SAPO-44 contains 45.3 to 61.0 percent Si(4Al) species.

5. A SAPO-44 molecular sieve made by a method comprising:
   forming a mixture comprising, a silicon component, an aluminum component, a phosphorus component, and an organic template, said mixture having the formula $T_aSi_wAl_xP_yO_z$·b $H_2O$, excluding other species present in said mixture, wherein T represents the organic template, a/w is from about 2 to about 8, a/x is from about 1 to about 5, a/y is from about 1 to about 5, y/x is from about 1 to about 0.2, and a/b is from about 0.02 to about 0.2; and
   subjecting said mixture to conditions effective to produce said SAPO-44, wherein said SAPO-44 contains 30.9 to 61.0 percent Si(4Al) species.

6. A SAPO-44 molecular sieve according to claim 5, wherein said SAPO-44 contains 45.3 to 61.0 percent Si(4Al) species.

7. A SAPO-44 molecular sieve composition made by a method comprising:
   mixing boehmite with an aqueous orthophosphoric acid solution under first condition effective to form a first product;

adding a silica gel to said first product under second conditions effective to form a second product;

adding a mixture comprising cyclohexylamine and water to said second product under third conditions effective to form a third product wherein said third product exhibits a pH from about 5.5 to about 8.5 and comprises a compound of the formula $T_a Si_w Al_x P_y O_z \cdot b\ H_2O$, wherein T represents cyclohexylamine, a/w is from about 2 to about 8, a/x is from about 1 to about 5, a/y is from about 1 to about 5, y/x is from about 1 to about 0.2, and a/b is from about 0.02 to about 0.2;

subjecting said third product to a temperature in the range of from about 100° C. to about 270° C. for a period of time sufficient to form a solid material;

drying said solid material at a temperature from about 25° C. to about 120° C. and at a pressure from about 0.01 kPa to about 150 kPa to form a dried solid material; and calcining said dried solid material to form said SAPO-44 molecular sieve composition, wherein said SAPO-44 has 30.9 to 61.0 percent Si(4Al) species.

8. A SAPO-44 molecular sieve composition as claimed in claim 7, wherein said SAPO-44 contains 45.3 to 61.0 percent Si(4Al) species.

9. A SAPO-44 molecular sieve made from a reaction mixture having the formula $T_a Si_w Al_x P_y O_z \cdot b\ H_2O$, wherein T represents an organic template, a/w is from about 2 to about 8, a/x is from about 1 to about 5, a/y is from about 1 to about 5, y/x is from about 1 to about 0.2, and a/b is from about 0.02 to about 0.2, wherein said SAPO-44 contains 30.9 to 61.0 percent Si(4Al) species.

10. A SAPO-44 molecular sieve as claimed in claim 9, wherein said SAPO-44 contains 45.3 to 61.0 percent Si(4Al) species.

* * * * *